United States Patent [19]
Plouffe

[11] 3,762,020
[45] Oct. 2, 1973

[54] SNAP RING TOOL
[76] Inventor: Emile P. Plouffe, Solon, Ohio
[22] Filed: Sept. 1, 1971
[21] Appl. No.: 177,006

[52] U.S. Cl. ................................................ 29/229
[51] Int. Cl. ............................................ B23p 19/04
[58] Field of Search .................. 29/222, 225, 227, 29/229

[56] References Cited
UNITED STATES PATENTS
| | | | |
|---|---|---|---|
| 1,764,146 | 6/1930 | Bramberry | 29/222 |
| 2,518,142 | 8/1950 | Huntington | 29/229 |
| 3,483,606 | 12/1969 | Ethridge | 29/229 |

Primary Examiner—Donald G. Kelly
Assistant Examiner—J. C. Peters
Attorney—J. Darrell Douglass

[57] ABSTRACT

A snap ring removal and installation tool includes a pair of elongated semi-tubular elements mounted on a bearing and retainer ring with a pair of snap ring engaging pins on one end and a pair of handles on the other end. The semi-tubular members are designated to provide a gap between them to allow limited rotational movement of the elements on the bearing and retainer. A spring holds the handles apart. The movement of the snap ring engaging pins is an arcuate movement.

10 Claims, 5 Drawing Figures

PATENTED OCT 2 1973  3,762,020
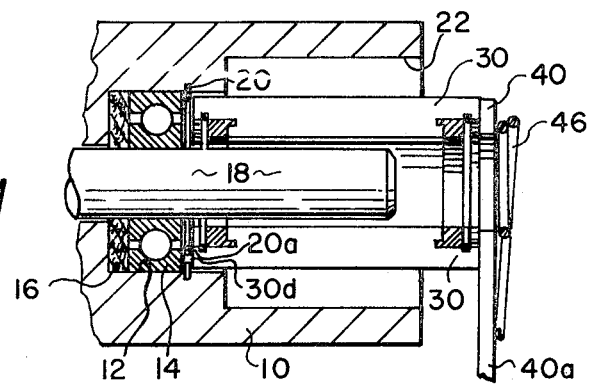
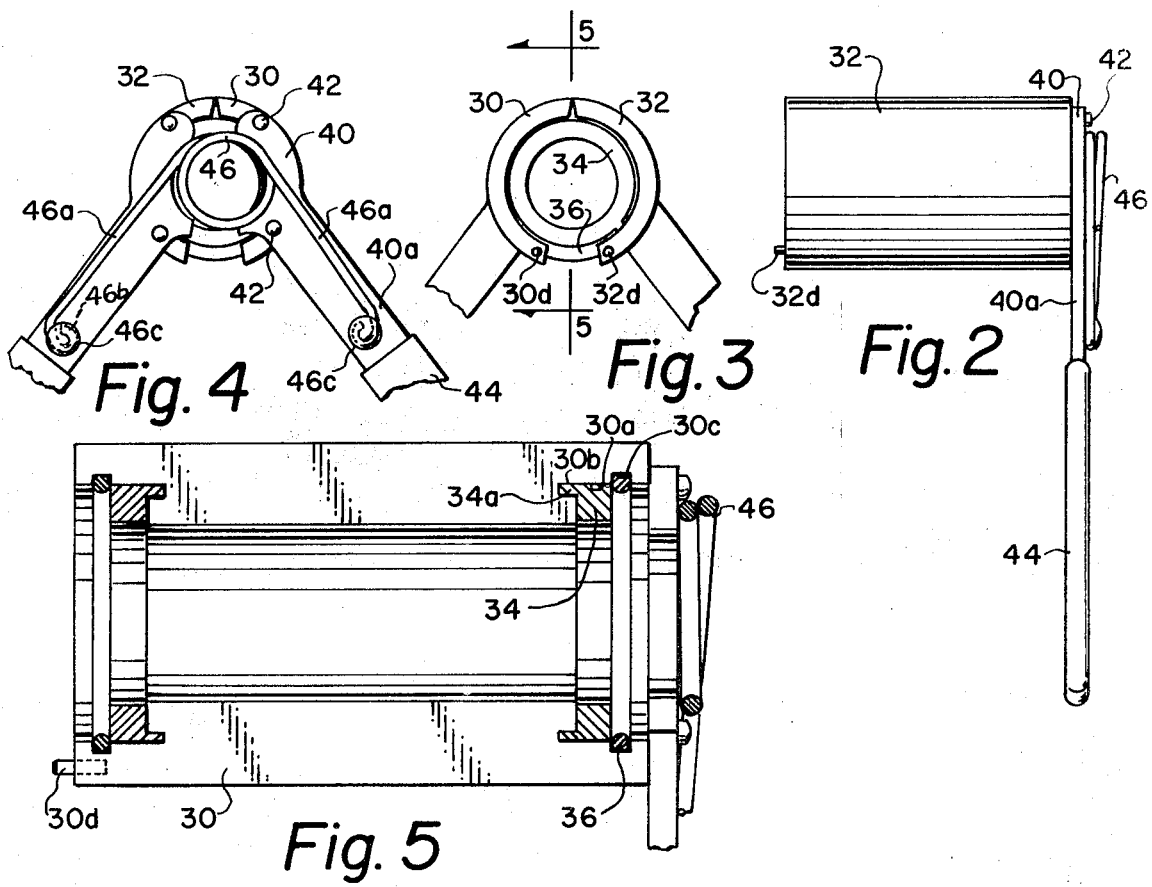
INVENTOR.
Emile P. Plouffe

SNAP RING TOOL

This invention relates to improvements in tools for the installation and removal of open ended spring retaining rings commonly called snap rings, and more particularly to a tool where snap rings may be inserted or removed from more or less inaccessible places.

As is well known to those versed in the art, snap rings comprise an open ended ring-like body of spring steel which is formed with holes at the open ends formed for the reception of the points of a plier like tool whereby the ring may be expanded or contracted depending upon whether it is the contracting or expanding type.

Although in most instances there is no problem in connection with the installation or removal of the rings because they are readily accessible, there are places where the ring is in such a place that it is not readily accessible and where it is difficult and time-consuming to remove and insert the same.

One particular place is where a bearing, packing or both are disposed around a shaft within a tubular housing and held in place by a snap ring. The clearance between the shaft and the housing is frequently so small as to make it difficult if not impossible to operate the ordinary snap ring tools due to the fact that the jaws of the pliers are limited in their movement. In addition the snap ring sets so far back in the housing that it may not be readily visible. One such situation is found in certain automobile air conditioner installations.

The tool of the present invention, although useful in other places, enables snap rings to be removed quickly and easily without damage to the rings or other parts associated therewith. It is so easy to use that it can be used by persons with a minimum of skill in places where the ring is not even visible, it is an improvement over U.S. Pat. No. 3,483,606.

Still other advantages of the invention and the invention itself will become more apparent from the following description of an embodiment thereof which is illustrated by the accompanying drawings and forms a part of the specification.

In the drawings:

FIG. 1 is a view of a portion of a housing which supports a shaft and a bearing that are held in by snap ring and showing one half of the tool of the invention in position;

FIG. 2 is an elevational view of the tool;

FIG. 3 and 4 are views from the left and right sides respectively of the tool of FIG. 2;

and FIG. 5 is an enlarged section taken from the end 5-5 of FIG. 3.

Referring to the drawings and more particularly to FIG. 1, there is shown a place where it is difficult to install or remove a snap ring. A tubular housing 10, which may be on the end of a motor or compressor, and which is counterbored to provide a seat 12 for a bearing and/or packing 14 and 16 and which are held in position around a shaft 18 by a snap ring 20 of the expansion type disposed in a circumferential groove in the counterbore. The end portion of the housing may have a slightly enlarged bore 22 and the end formed (not shown) for connection to another piece of equipment.

It will be noted that the bearing and snap ring are inward from the end of the housing and that the counterbore that forms the seat is so small in diameter as to leave but a small access space to the snap ring. As is customary the snap ring, which is of the expansion type, has inwardly extending ears 20a with an aperture in each ear for the reception of the points of a tool whereby it may be compressed or contracted. When the ring is disposed in a groove in a shaft the apertured ears would extend outward.

Briefly the tool has a pair of projections which are engaged in the holes in the ears of the snap ring and then the projections are moved in an arcuate path around the axis of the ring as distinguished from the prior devices which simply moved outward or inward. The tool includes a cylindrical tubular body, split longitudinally into separate parts and held together by a bearing and retainer ring with a pair of pins projecting from the parts on one end for insertion in the holes in the snap ring and a pair of operating handles on the other end. The parts are so designed that when assembled there is a gap between the opposed edges of the parts which gap can be closed by moving the handle toward each other. Spring means is used to hold the handles apart.

More specifically the tool is made up of a pair of generally semicylindrical tubular members 30–32 which when assembled provide a nearly complete two part tube with the parts rotatable about their common axis relative to each other.

As best seen by FIG. 5, each member is formed with a seat 30a which is undercut at 30b to provide a groove, in which a solid bearing and retainer ring 34 is disposed, the ring having a main body seated in the seat 30a and a flange 34a extending into the groove 30b. The ring 34 thus holds the members against radial movement and provides a bearing around which the parts may be rotated.

The bearing ring is held in place by a split spring ring 36 disposed in a groove 30c on the inner side of each member to hold the retainer ring 34 in place. A like means is provided at each of the ends of the members.

Thus the two members 30–32 are held in assembled relation to each other as best seen from FIGS. 3 and 4. The members being less than a complete circular tube, have a gap at the lower opposite edges which may be on the order of 15-½ degrees when the top edges are in contact, although the gap may vary.

Preferably the diameter of the members, when assembled, is very nearly that of the bore of the piece of apparatus in which the snap ring is disposed.

Each of the members 30–32 is provided with a short pin 30d and 32d driven into a blind hole in the member, adjacent the gapped edges and extending longitudinally outward parallel to the axis of the assembly beyond the ends of the members. The size of the pins is such that they may be engaged in the holes in the ends of the snap ring. They may taper inward from the ends toward the body if desired. Since the members 30–32 may be rotated relative to each other on the bearing and retainer rings 34, it is apparent that the distance between pins 30d–32d may be varied depending upon the maximum width of the gap between the members and that they move in an arc the radius of which has its locus at the axis of the tool.

Means for rotating the members, as best seen from FIG. 4, comprises a pair of handles, which may be stampings, each having an arcuate end part 40 with a handle 40a projecting therefrom. The end part is of the same curvature as the elements 30–32 and one is secured to the end of each element by drive pins 42. The handles may each have a plastic sheath 44, thereon for the hand engaging portion.

It is preferred that spring means be provided for resiliently holding the handles apart and thus provide maximum gap width between the elements 30–32. To this end a wire spring element having a bight portion 46 of one or more helical convolutions and a pair of opposite legs 46a with the ends formed to provide eyes 46b is provided, the spring being formed so the legs are spread apart and secured to the handles by rivets 46c with the bight part opposite the axis of the tool. Thus the tool in its normal position is held with the maximum gap between the members on the side toward the handles. It is pointed out that a tool of the type for removing snap rings that must be expanded can be provided by moving the pins 30d–32d from the lower edges of the elements as shown to the upper ends.

In operation, it being desired to remove a snap ring from a piece of apparatus such as is illustrated in FIG. 1 the tool is passed with its axis around the shaft 18 with the pin ends inward toward the snap ring until it engages the snap ring. Then it is rotated until one of the pins 30d or 32d engage in the gap of the ring, moved outward slightly and then, rotated counter-clockwise and pressed inward until the pin engages in one of the holes. Then the other pin may be engaged in the other hole of the snap ring. This may require some slight pressure on the handles. The tool being nearly the same size as the bore 12, the above procedure is relatively simple, and, with very little experience, can be effected without the need to view the snap ring.

Since the snap ring is now engaged by the tool, the handles may be moved toward each other to compress the snap ring and release it from the groove and withdrawn from the apparatus along with the removal tool. When installing snap ring, an additional advantage is realized because of the ease with which the snap ring may be assembled on the end of the tool, where, after the pins are in the opening the body of the snap ring, lies flat against the ends of the elements enabling the snap ring to be compressed and firmly held while being inserted with no tendency for the ring to engage the wall of the bore and be tilted thereby, since upon compression the body of the snap ring is of lesser diameter than that of the tool.

The general tubular construction of the device has many advantages over the prior art. The exterior is guided by the interior of the housing and/or by the shaft to the snap ring. The elements can be of any length desired other than that shown depending upon how far in the snap ring is from the end of the housing. It can also be used where there is no housing to interfere and has the advantage in all instances that it operates much more smoothly than ordinary snap ring pliers and can be designed with a gap such that the snap rings will not be over stressed and bent out of shape. In addition the movement of the pins in an arcuate direction causes the pressure on the snap ring to be directly into the ring following the curvature thereof rather than along lines tangent to the axis of the ring.

I claim:

1. A snap ring tool comprising means for engagement with the walls of the apertures in the open ends of a ring and means to expand and contract said ring by moving said engaging means in arcuate paths substantially coincident with the curvature of the body of the ring said engaging means comprises a pair of semi-cylindrical members each having longitudinally extending edges, said members being arranged to be rotated in arcuate paths and in their assembled condition forming less than a complete cylindrical tube to provide a gap between the edges.

2. A tool as described in claim 1 wherein said members may be moved to cause their edges to meet and pin means is provided at the ends of said members near the meeting edges.

3. A tool as described in claim 2 wherein the pin means is of a size to enter the apertures in the snap ring and extend longitudinally from the ends of said members substantially parallel to the common axis.

4. A tool as described in claim 3 wherein retainer and bearing means is provided for said members arranged to hold said members assembled and providing bearing means about which said members may be oscillated to vary the size of said gap.

5. A tool as described in claim 4 wherein a pair of handles are secured to the ends of said members opposite to the ends with the pin means.

6. A tool as described in claim 5 wherein spring means is connected to said handles to resiliently urge them apart.

7. A tool as described in claim 4 wherein ring means holds the retainer and bearing means in place.

8. A tool as described in claim 4 wherein said members are formed with seats in opposite ends and said retainer means is disposed in said seats.

9. A tool as described in claim 8 wherein said seats are formed with a groove in the bottom of the seat and said retainer member is formed with a flange extending into the groove.

10. A tool as described in claim 6 wherein said spring means includes a bight portion disposed opposite the axis of said members and a pair of arms extending from the bight portion and are secured to said handles.

* * * * *